(12) United States Patent  (10) Patent No.: US 7,430,218 B2
Lee et al.  (45) Date of Patent: Sep. 30, 2008

(54) APPARATUS AND METHOD FOR PROVIDING USERS WITH ROAD TRAFFIC INFORMATION USING AD-HOC NETWORK

(75) Inventors: Chang-Kyun Lee, Suwon-shi (KR); Eun-Tae Won, Seoul (KR); Suk-In Jung, Seoul (KR); Kyung-Hee Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 791 days.

(21) Appl. No.: 10/808,752

(22) Filed: Mar. 25, 2004

(65) Prior Publication Data

US 2005/0002347 A1  Jan. 6, 2005

(30) Foreign Application Priority Data

Jun. 18, 2003  (KR) .................... 10-2003-0039424

(51) Int. Cl.
*H04J 15/00* (2006.01)
(52) U.S. Cl. ....................... 370/464; 701/117
(58) Field of Classification Search ............... 370/312, 370/313, 349, 464, 465, 471, 473, 487, 490, 370/493, 494, 495, 496, 498, 503; 701/117, 701/207, 208, 209; 340/993
See application file for complete search history.

(56) References Cited

U.S. PATENT DOCUMENTS 6,317,682 B1 * 11/2001 Ogura et al. ............... 701/117

2003/0045971 A1  3/2003  Reinold et al.
2003/0091010 A1  5/2003  Garahi et al.

FOREIGN PATENT DOCUMENTS

| EP | 1 262 935 | 12/2002 |
|---|---|---|
| EP | 1 286 507 | 2/2003 |
| FR | 2 823 413 | 4/2001 |
| GB | 2 358 506 | 7/2001 |
| JP | 05-126592 | 5/1993 |
| JP | 09-180094 | 7/1997 |
| WO | WO 02/31793 | 4/2002 |

\* cited by examiner

*Primary Examiner*—Chi H. Pham
*Assistant Examiner*—Alexander Boakye
(74) *Attorney, Agent, or Firm*—The Farrell Law Firm, PC

(57) ABSTRACT

A traffic information service apparatus using an ad-hoc network and a method for controlling the same. The apparatus provides an ad-hoc network between vehicles and roadside devices, and collects/provides traffic information using the ad-hoc network. The method for providing a user with traffic information, comprising the steps of a) allowing vehicles to broadcast their registration messages to create an ad-hoc network, and creating the ad-hoc network between the vehicles on the basis of the registration messages, b) allowing a Road Side Equipment (RSE) to receive the registration messages broadcast from the vehicles, and collecting traffic information from the registration messages, and c) allowing the RSE to transmit the traffic information to a traffic information service center.

18 Claims, 7 Drawing Sheets

US 7,430,218 B2

APPARATUS AND METHOD FOR PROVIDING USERS WITH ROAD TRAFFIC INFORMATION USING AD-HOC NETWORK

PRIORITY

This application claims priority to an application entitled "APPARATUS AND METHOD FOR PROVIDING USERS WITH ROAD TRAFFIC INFORMATION USING AD-HOC NETWORK", filed in the Korean Intellectual Property Office on Jun. 18, 2003 and assigned Serial No. 2003-39424, the contents of which are hereby incorporated by reference.

BACKGROUND OF THE INVENTION

1. Field of the Invention

The present invention relates to a road traffic information system using an ad-hoc network, and more particularly to an apparatus and method for providing an ad-hoc network between vehicles and roadside devices and collecting/providing road traffic information using the ad-hoc network.

2. Description of the Related Art

A Dedicated Short Range Communication (DSRC) system has been widely used as a conventional road traffic information system. The DSRC system performs wireless communication between an On Board Equipment (OBE) of a vehicle and a Road Side Equipment (RSE). The DSRC system can perform wireless communication between the OBE and the RSE when, for example, a vehicle equipped with the OBE travels through a prescribed communication area formed by an antenna connected to the RSE. Preferably, the RSE may be either a small-sized mobile communication base station installed on a roadside or a road or a Wireless Local Area Network (WLAN) Access Point (AP).

FIG. 1 shows a conventional road traffic information system using such a DSRC system. When a plurality of vehicles 10, 11, 12, 16 and 19 travel through a prescribed communication area of the RSE 25, wireless communication is established between the vehicles and the RSE 25 as shown in FIG. 1. When vehicles 11, 12, 13, 14 and 15 travel through a prescribed communication area of the RSE 20, wireless communication is also established between the vehicles 11 to 15 and the RSE 20. When vehicles 17, 18 and 19 travel through a prescribed communication area of the RSE 30, wireless communication is also established between the vehicles 17 to 19 and the RSE 30. The RSEs 20, 25 and 30 receive road traffic information from a traffic information service center, and transmit the road traffic information to vehicles located within individual communication areas of the RSEs.

The road traffic information is received from a plurality of detectors mounted to a roadside or a road. The detectors may be added to the RSEs 20, 25, and 30 respectively, or may be installed independent of the RSEs. Otherwise, the RSEs 20, 25, and 30 may request driving information from vehicles 10-19 traveling along the communication areas, and may receive the driving information from the vehicles 10-19, such that the received driving information can be adapted as road traffic information.

However, the aforementioned conventional road traffic information system must add a detector to a RSE or must install a detector on the road, resulting in a complicated RSE and an increased production cost. Further, the conventional road traffic information system has a disadvantage in that it increases the amount of network load due to the increased amount of traffic between the RSE and the vehicle when the RSE requests driving information from vehicles. What is needed is an improved system and method for effectively collecting road traffic information without increasing the amount of network load and at the same time using an additional device.

SUMMARY OF THE INVENTION

Therefore, the present invention has been made in view of the above problems, and it is an object of the present invention to provide a system and method for creating an ad-hoc network comprised of vehicles and a Road Side Equipment (RSE), and collecting road traffic information through the ad-hoc network.

It is another object of the present invention to provide a system and method for enabling a RSE to collect road traffic information using vehicle registration messages broadcast from vehicles so as to create an ad-hoc network.

It is yet another object of the present invention to provide a system and method for creating an ad-hoc network comprised of vehicles and a RSE according to vehicle driving information, and controlling the RSE to collect road traffic information from the vehicle driving information.

In accordance with one aspect of the present invention, the above and other objects can be accomplished by the provision of a method for providing a user with road traffic information, comprising the steps of: a) allowing vehicles to broadcast their registration messages to create an ad-hoc network, and creating the ad-hoc network between the vehicles on the basis of the registration messages; b) allowing a RSE to receive the registration messages broadcast from the vehicles, and collecting road traffic information from the registration messages; and c) allowing the RSE to transmit the road traffic information to a road traffic information service center.

In accordance with another aspect of the present invention, there is provided a method for allowing a RSE (Road Side Equipment) to create an ad-hoc network between the RSE and vehicles to collect road traffic information, comprising the steps of: a) allowing vehicles to broadcast their registration messages to create an ad-hoc network, and receiving the registration messages at the RSE; b) registering the registration messages to a node management table, and creating the ad-hoc network between the RSE and the vehicles; and c) collecting road traffic information from the registration messages, and, transferring the collected road traffic information to the road traffic information service center.

In accordance with yet another aspect of the present invention, there is provided a method for providing a user with road traffic information, comprising the steps of: a) allowing vehicles to broadcast their registration messages to create an ad-hoc network; b) allowing the RSE to receive the registration messages, and forming an ad-hoc network associated with the vehicles on the basis of the registration messages; and c) allowing the RSE to receive road traffic information from a road traffic information service center, and transferring the road traffic information to the vehicles contained in the ad-hoc network.

In accordance with yet a further aspect of the present invention, there is provided an apparatus for providing a user with road traffic information, comprising: a plurality of vehicles for broadcasting their registration messages to create an ad-hoc network, and creating the ad-hoc network on the basis of the registration messages; a RSE for receiving the registration messages broadcast from the vehicles, and collecting road traffic information from the registration messages; and a road traffic information service center for receiving the road traffic information from the RSE.

In accordance with yet another aspect of the present invention, there is provided a RSE apparatus for collecting road traffic information from vehicles, and transferring the collected road traffic information to the road traffic information service center in a system for providing a user with road traffic information, comprising: a Radio Frequency (RF) unit for receiving registration messages broadcast from the vehicles, and broadcasting a registration message of a RSE; a controller for creating an ad-hoc network associated with the vehicles on the basis of the registration messages of the vehicles, and generating road traffic information from the registration messages; and a communication interface for transferring the road traffic information to the road traffic information service center.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
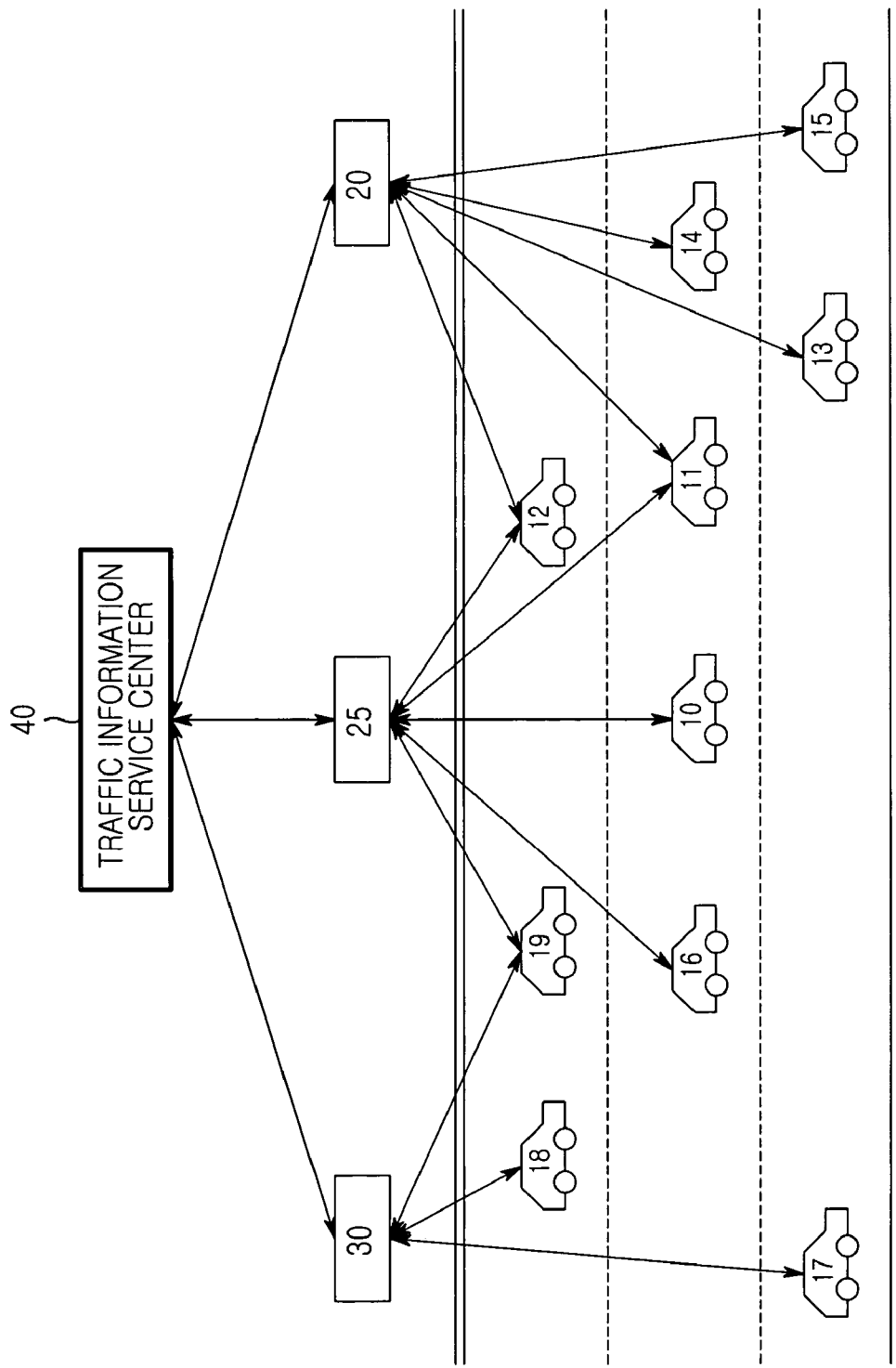
FIG. 1 is a diagram of a conventional road traffic information system.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 2:
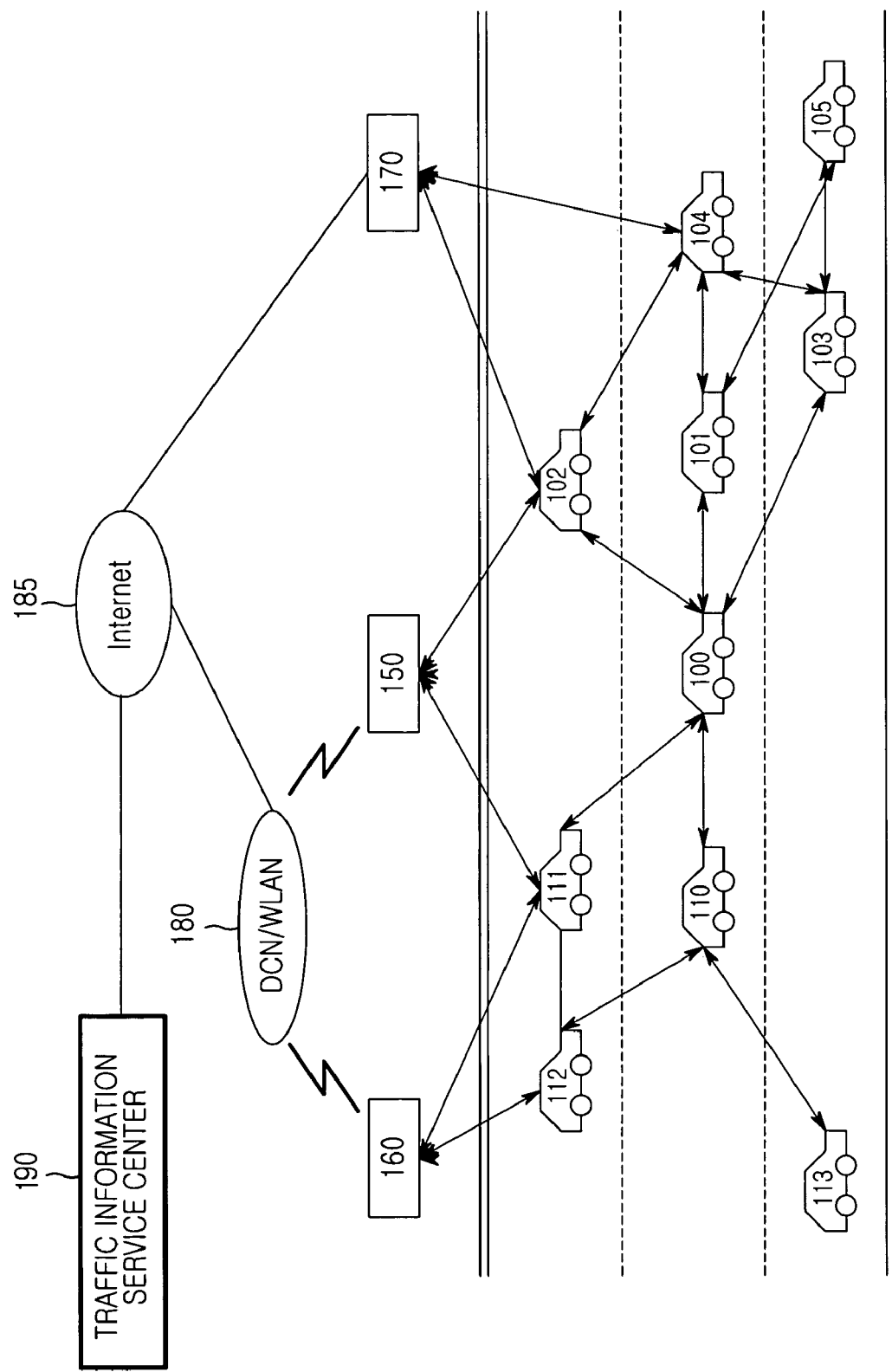
FIG. 2 is a diagram of a road traffic information system in accordance with a preferred embodiment of the present invention.

FIG. 2 illustrates a road traffic information system in accordance with a preferred embodiment of the present invention. The road traffic information system includes a plurality of vehicles 100, 101, 102, 103, 104, 105, 110, 111, 112 and 113 and a plurality of RSEs 150, 160 and 170. The vehicles and the RSEs form a temporary wireless network, e.g., an ad-hoc network. In this case, it is assumed that the temporary wireless network applied to the present invention is an ad-hoc network, but any network scheme capable of forming such an ad-hoc network between vehicles can be used for the present invention. The RSEs 150-170 communicate with a road traffic information service center 190 connected to the Internet over wired/wireless networks. For example, the RSEs 150 and 160 can communicate with the road traffic information service center 190 connected to the Internet via a Data Core Network (DCN) or Wireless Local Area Network (WLAN) 180. There are various kinds of DCN, including for example, a Code Division Multiple Access (CDMA) scheme, a Global System for Mobile communication (GSM) scheme, a General Packet Radio Service (GPRS), etc. The RSE 170 can communicate with the road traffic information service center 190 over the Internet 185 using a wire connection.

The RSEs 150, 160 and 170 can receive road traffic information from vehicles via the ad-hoc network, or can provide vehicles with the received road traffic information.

Figure 3:
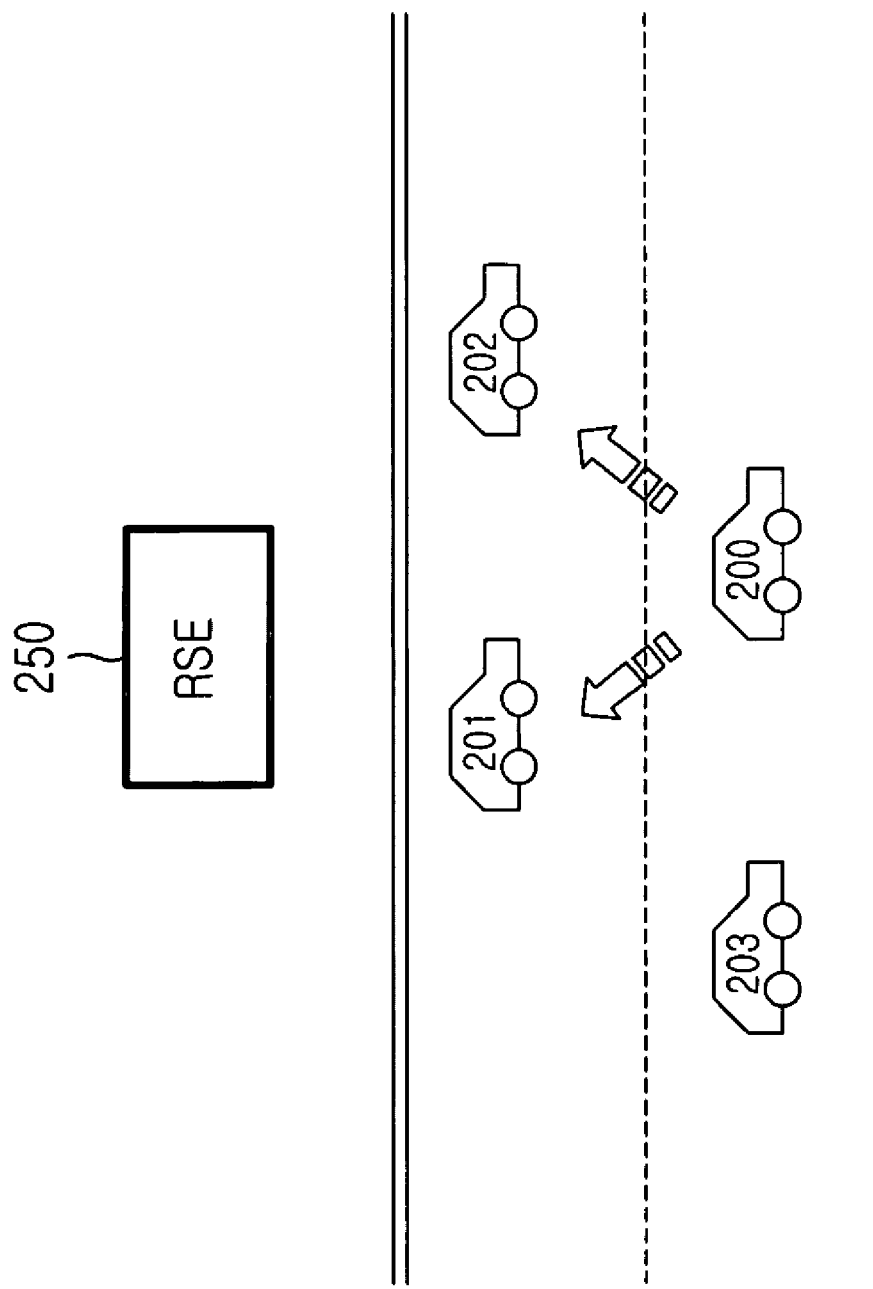
FIG. 3 is a diagram of a procedure for forming an ad-hoc network between vehicles in accordance with a preferred embodiment of the present invention.

FIG. 3 illustrates a method for forming an ad-hoc network between vehicles in accordance with a preferred embodiment of the present invention. The method for forming the ad-hoc network between vehicles and a RSE will hereinafter be described with reference to FIG. 3 and the following Table 1.

TABLE 1

| Vehicle Identifier (ID) (300) | Position (310) | Speed (320) | Direction (330) | Acceleration (340) | Right/Left variation (350) | Relative distance (360) |
|---|---|---|---|---|---|---|
| 200 | $X_{200}, Y_{200}$ | 100 Km | 120 | 8 Km | 0 | 000:50 m |
| 201 | $X_{201}, Y_{201}$ | 90 Km | 120 | 12 Km | −2 | 290:20 m |
| 202 | $X_{202}, Y_{202}$ | 105 Km | 120 | 10 Km | +3 | 350:80 m |
| . | . | . | . | . | . | . |
| . | . | . | . | . | . | . |

The Table 1 shows a node management table used for managing driving information of nearby vehicles to allow individual vehicles and RSEs to form an ad-hoc network therebetween.

Referring to FIG. 3, the vehicle 200 measures various driving information, for example, vehicle position, speed, acceleration, and right/left variation, etc., using its own sensors. The vehicle 20 adapts the driving information as a registration message, and broadcasts it to nearby vehicles 201, 202, and 203. The registration message is adapted to transmit the driving information of one vehicle to the nearby vehicles so as to create an ad-hoc network. The registration message may be periodically broadcast, or may be broadcast when there is a need for the registration message to be updated, due to a variation in a vehicle driving environment. The RSE 250 broadcasts a registration message equipped with the vehicle position information to create an ad-hoc network associated with the vehicles 200-203, such that all vehicles located within a prescribed communication range of the RSE 250 can receive the registration message.

The vehicles and the RSEs receive the broadcast registration messages from nearby vehicles, and manage the broadcast registration messages using a node management table. It is first determined whether a source vehicle sending the registration message is registered in the node management table. If the received registration message is transferred from an unregistered vehicle, then source vehicle ID information 300 and driving information of the source vehicle are newly registered in the node management table. It is assumed that the driving information includes, as shown in Table 1, position information 310, speed information 320, traveling direction information 330, acceleration information 340, and right/left variation of the source vehicle. However, it should be noted that the present invention can further include information indicating vehicle driving information or can include only some information from among all the driving information. In the meantime, the relative distance 360 indicates a position angle of the source vehicle (200-201) on the basis of a traveling direction of the receiver vehicle and a relative distance between the receiver vehicle and the source vehicle. The receiver vehicle used for receiving the registration message calculates its own position and source vehicle's position information, such that it recognizes a relative distance and updates the node management table.

In the meantime, the RSEs possess the same IDs, such that vehicles receiving the registration message broadcast from the RSEs can discriminate between the registration messages of the vehicles and other registration messages of nearby vehicles, i.e., discriminate between RSE and vehicle broadcast registration messages.

Figure 4:
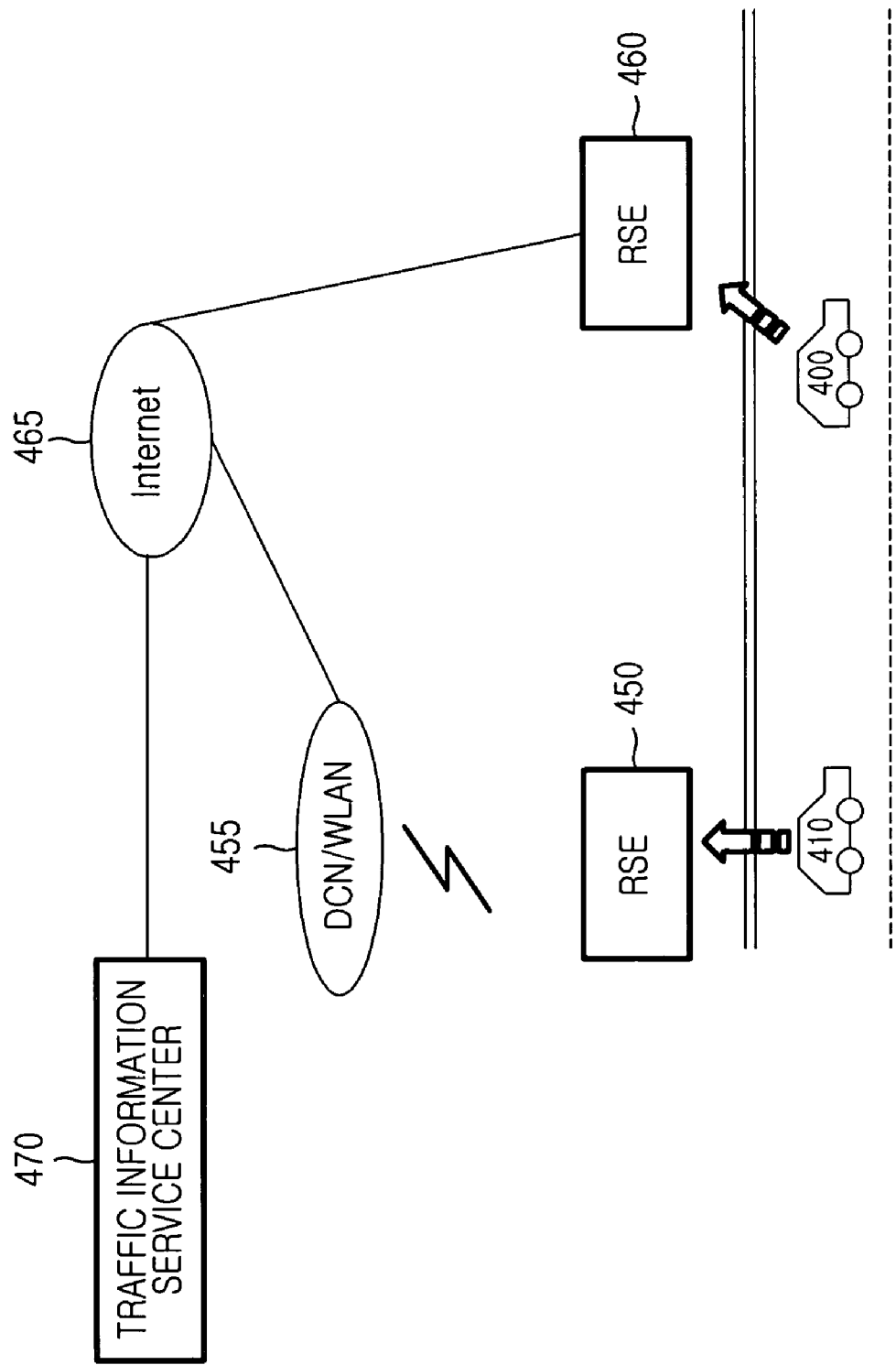
FIG. 4 is a diagram of a procedure for collecting real-time road traffic information in accordance with a preferred embodiment of the present invention.

FIG. 4 illustrates a method for collecting real-time road traffic information in accordance with a preferred embodiment of the present invention. The method for controlling the RSE to collect road traffic information using registration message information broadcast from vehicles will hereinafter be described with reference to FIG. 4.

The vehicles 400 and 410 generate their driving information using their registration messages to form an ad-hoc network associated with nearby vehicles, and broadcast the driving information to the nearby vehicles. The RSEs 450 and 460 receive the registration messages, and collect real-time road traffic information from driving information contained in the registration messages. The RSEs 450 and 460 extract road traffic information (e.g., traveling speeds and directions of the vehicles 400 and 410 broadcasting the registration messages) from the registration messages. The traveling speed information along with message transfer time information is transmitted to the road traffic information service center 470 connected to the Internet 465 over a wired/wireless network 455. The road traffic information service center 470 performs standardization on the basis of vehicles' speed information transferred from the RSE 450, and creates standardized road traffic information such as mean speed information of nearby vehicles of the RSE 450.

According to a preferred embodiment of the present invention, it is assumed that the RSEs provide the road traffic information service center with individual road traffic information (e.g., vehicle speed or direction information) contained in the registration message, and the road traffic information service center generates standardized road traffic information such as mean speed information of nearby vehicles of the RSE. However, it should be noted that the RSEs 450 and 460 collect driving information of vehicles to create standardized road traffic information, and only the standardized road traffic information can be transferred to the road traffic information service center 470.

In the meantime, the vehicles 400 and 410 providing an ad-hoc network broadcast warning messages to nearby vehicles over the ad-hoc network so as to prevent traffic accidents or collisions between vehicles. There are a variety of messages in such a warning message, that is, a traffic accident message, a road condition message, and a weather condition message, etc. Because the RSEs are contained in the ad-hoc network formed between vehicles, the warning messages can be collected as road traffic information. In other words, the RSEs 400 and 410 receive the warning messages from vehicles providing the ad-hoc network, collect road traffic information from the warning messages, and transmit the collected road traffic information to the road traffic information service center 470 connected to the Internet over the wired/wireless network 455.

Figure 5:
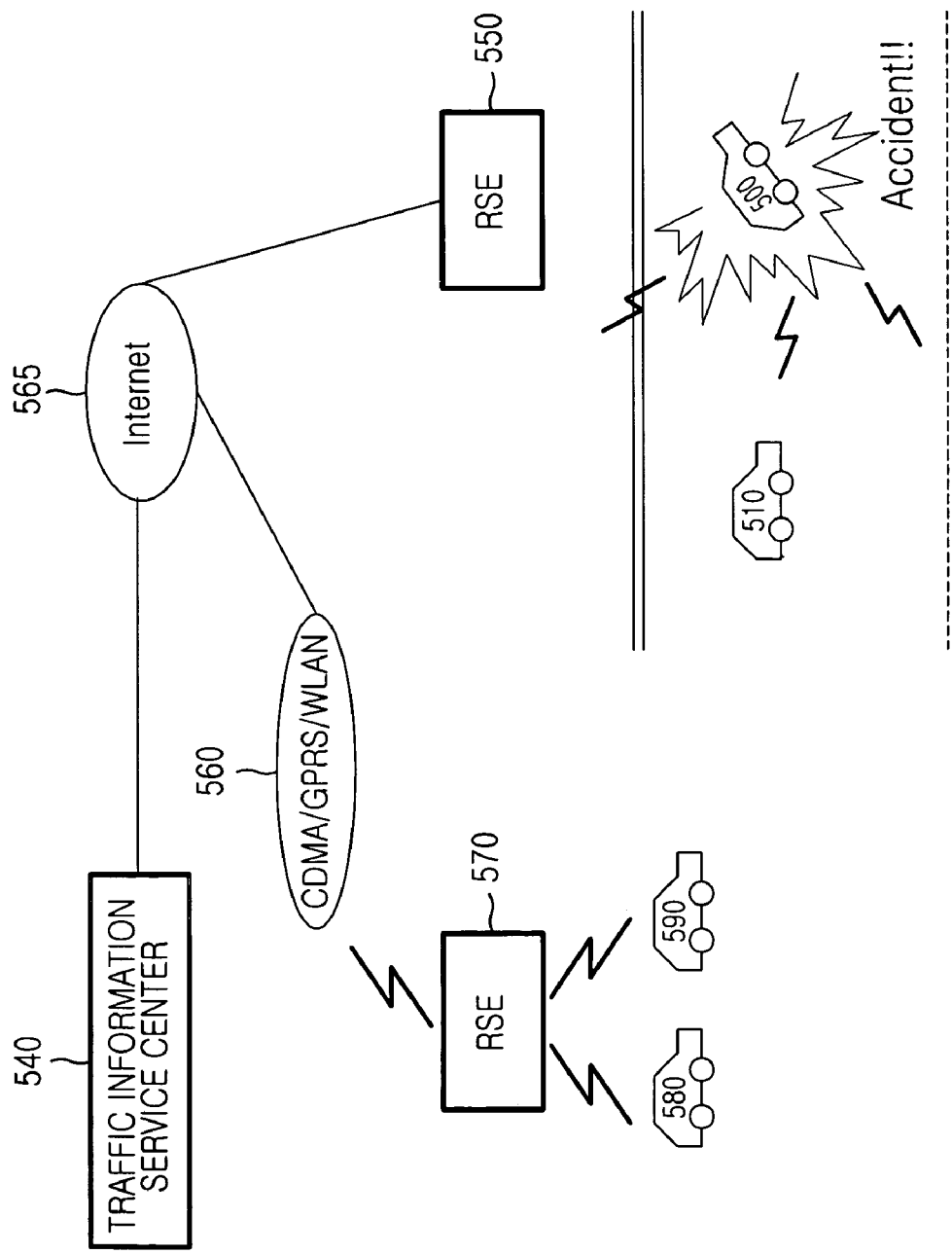
FIG. 5 is a diagram of a procedure for collecting/providing road traffic information using a warning message in accordance with a preferred embodiment of the present invention.

FIG. 5 illustrates a method for collecting/providing road traffic information using such a warning message in accordance with a preferred embodiment of the present invention. Provided that a traffic accident occurs when the vehicle 500 is traveling on a road, the vehicle 500 adapts traffic accident information as a warning message, and broadcasts the warning message to the RSE 550 and rear vehicles forming an ad-hoc network. The RSE 550 receives the warning message, and transmits the traffic accident information to the road traffic information service center 540. The road traffic information service center 540 transmits the traffic accident information to the RSE 570, which provides coverage for a different section of the road. The RSE 570 transmits the traffic accident information, serving as real-time road traffic information, to the vehicles 580 and 590, which form an ad-hoc network with the RSE 570 with reference to the node management table.

Figure 6:
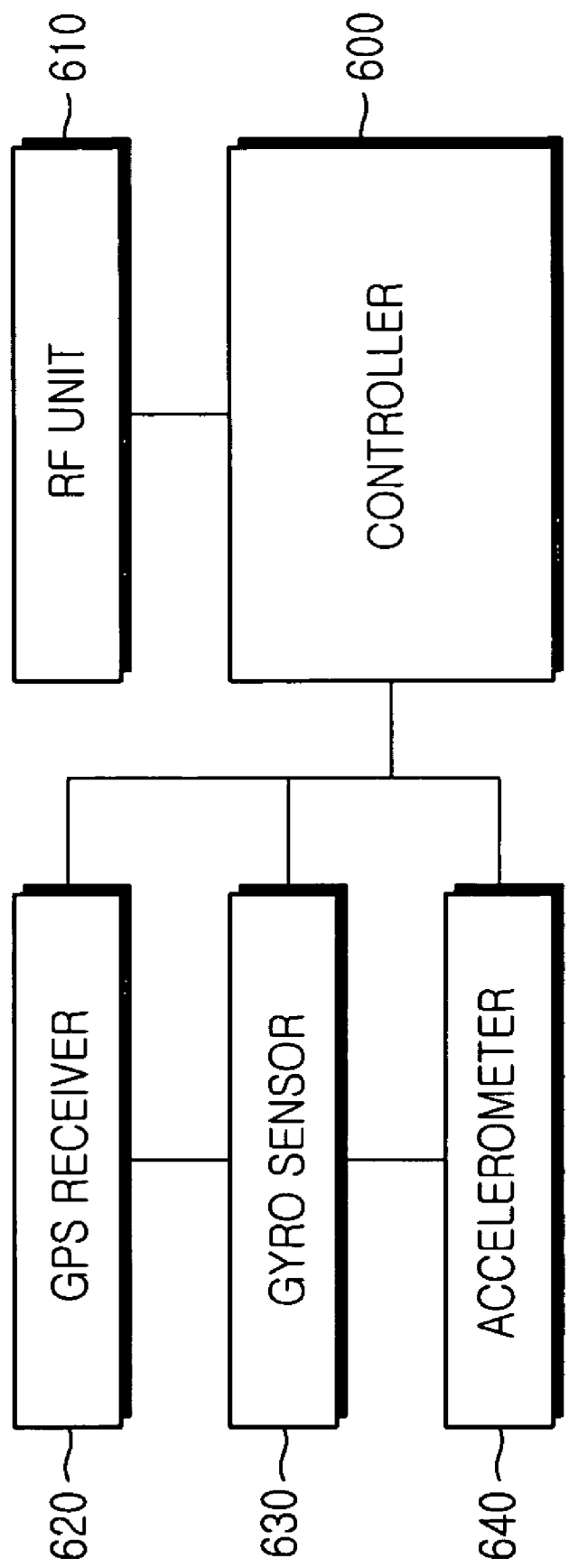
FIG. 6 is a block diagram of an On Board Equipment (OBE) mounted to a vehicle in accordance with a preferred embodiment of the present invention.

FIG. 6 is a block diagram of an On Board Equipment (OBE) mounted to a vehicle in accordance with a preferred embodiment of the present invention. The OBE includes a Radio Frequency (RF) unit 610, a Global Positioning System (GPS) receiver 620, a gyro sensor 630, an accelerometer 640, and a controller 600.

The GPS receiver 620 collects position information of a vehicle. The gyro sensor 630 detects a rotation angle of the vehicle. The accelerometer 640 detects acceleration information of the vehicle. The RF unit 610 transmits either a registration message equipped with vehicle driving information or a warning message to nearby vehicles, or receives the registration message and the warning messages from the nearby vehicles. The controller 600 creates driving information of a current vehicle upon receiving a variety of information from the GPS receiver 620, the gyro sensor 630, and the accelerometer 640. The controller 600 further creates a registration message on the basis of the driving information and transmits the created registration message to the RF unit 610. The controller 600 receives registration messages from nearby vehicles via the RF unit 610, registers the received registration messages to the node management table (see Table 1), or updates the node management table.

Figure 7:
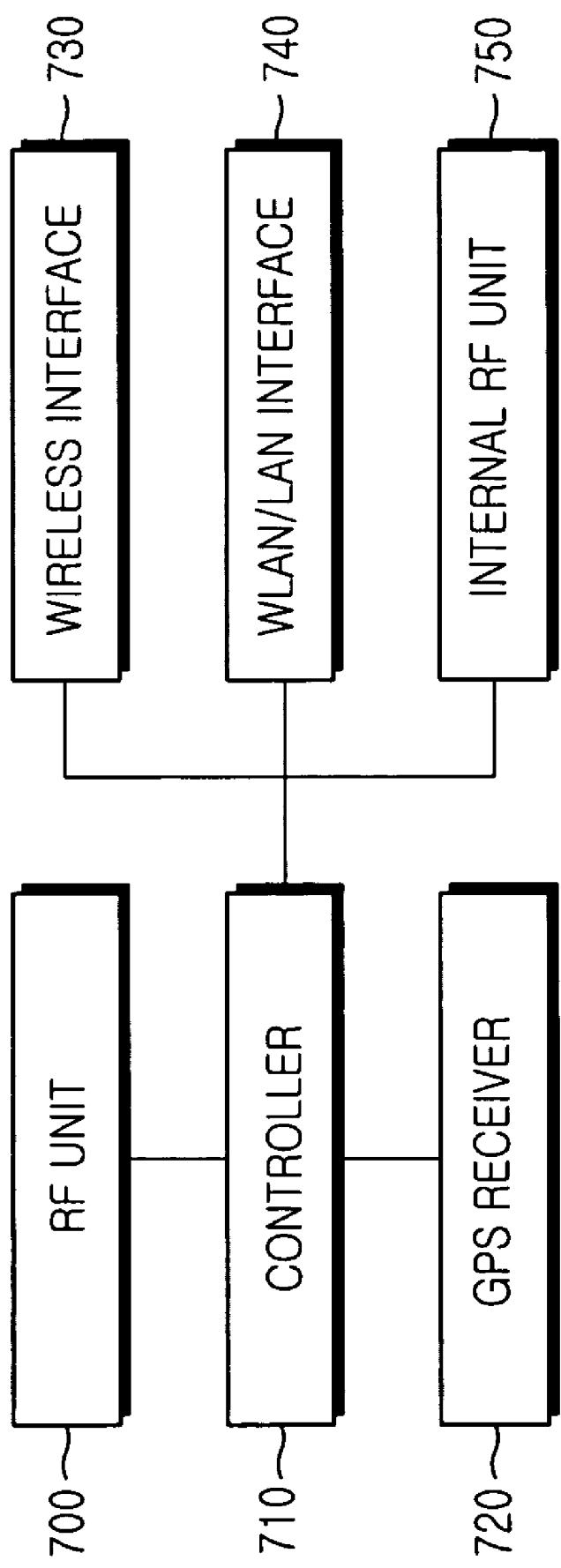
FIG. 7 is a block diagram of a RSE in accordance with a preferred embodiment of the present invention.

FIG. 7 is a block diagram of a RSE in accordance with a preferred embodiment of the present invention. The RSE includes a RF unit 700, a controller 710, a GPS receiver 720, wired/wireless interfaces 730, and 740 and an internal RF unit 750.

The RF unit 700 receives either a registration message or a warning message from vehicles to create an ad-hoc network associated with the vehicles. The RF unit 700 broadcasts the road traffic information received from the road traffic information service center 540 (FIG. 5) via the wired/wireless interfaces 730, 740, and 750 to vehicles providing such an ad-hoc network.

The GPS receiver 720 detects position and time information of the RSEs. The position information along with ID information of the RSEs is adapted as a registration message.

The communication interfaces 730, 740, and 750 are adapted to perform communication between the RSE and the road traffic information service center. The communication interfaces can be implemented with additional external devices (e.g., a wireless interface 730 and a WLAN/LAN interface 740), or can be implemented with the internal RF module 750. The RSE generally contains only one of such wired/wireless Interfaces 730, 740, and 750, but it may contain all communication interfaces.

The controller 710 creates road traffic information upon receiving vehicle driving information contained in the received registration messages of vehicles, and transmits the road traffic information to the road traffic information service center through the wired/wireless interfaces 730 to 750. The controller 710 can classify warning messages received from vehicles according to category information of the warning messages, and can transmit the classified messages to the road traffic information service center. In this case, the warning messages are classified into road traffic information, traffic accident information, or weather condition information, etc. In the meantime, the controller 710 receives road traffic information from the road traffic information service center, and transmits the received information to vehicles forming an ad-hoc network associated with the RSE through the RF unit 700.

As apparent from the above description, the inventive system and method for providing a user with road traffic information through an ad-hoc network according to the present invention adds a RSE to the ad-hoc network provided between vehicles, such that real-time traffic information can be effectively collected. The system controls the RSE to collect road traffic information using the ad-hoc network, such that road traffic information can be collected in an area wider than that of a detector, such that more accurate road traffic information can be transferred to users. Furthermore, the system can adapt information being broadcast over an ad-hoc network as road traffic information so as to prevent traffic accidents or collisions between vehicles, resulting in increased driving safety and greater convenience for the users.

The inventive apparatus and method can also be used to manage maritime, air, as well as pedestrian traffic. The on board equipment described in connection with FIG. 6 may be included in cell phones, computers, and personal digital assistant (PDA) devices carried by the pedestrians. Furthermore, a miniature on board equipment may be provided to an animal or a bird to monitor their movement and habits.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for providing a user with traffic information, comprising the steps of:
   a) each of a plurality of vehicles broadcasting a registration message requesting its registration;
   b) each of the plurality of vehicles receiving registration messages broadcast by other vehicles and registering the other vehicles which broadcast the received registration messages to a node management table to create an ad-hoc network between vehicles;
   c) at least one Road Side Equipment (RSE) receiving the registration messages broadcast by the plurality of vehicles, and collecting traffic information included in the received registration messages; and
   d) the RSE transmitting the collected traffic information to a traffic information service center.

2. The method as set forth in claim 1, wherein the registration messages include vehicle motion information.

3. The method as set forth in claim 1, further comprising the steps of:
   providing the RSE broadcasting IDentifier (ID) and position information of the RSE to the vehicles;
   each of the plurality of vehicles receiving registration messages broadcast by the RSE and registering the RSE to the node management table; and
   the RSE participating in the ad-hoc network between the vehicles.

4. The method as set forth in claim 3, further including the steps of:
   b1) the vehicles broadcasting warning messages over the ad-hoc network; and
   b2) the RSE receiving the broadcast warning messages and collecting traffic information included in the received warning messages.

5. The method as set forth in claim 3, further comprising the steps of:
   e) a the traffic information service center transferring the traffic information received from the RSE to another RSE; and
   f) the another RSE transferring the traffic information to nearby vehicles over the ad-hoc network in which the another RSE participates.

6. A method for at least one Road Side Equipment (RSE) to create an ad-hoc network between the RSE and a plurality of vehicles for collecting traffic information, comprising the steps of:
   a) from each of the plurality of vehicles receiving a registration message requesting its registration;
   b) registering the received registration message to a first node management table of the RSE and creating the ad-hoc network between the RSE and the vehicles; and
   c) collecting traffic information from the registration messages and transferring the collected traffic information to a traffic information service center.

7. The method as set forth in claim 6, wherein the registration messages include vehicle motion information.

8. The method as set forth in claim 6, wherein the step (b) includes the steps of:
   b1) broadcasting the registration message having IDentifier (ID) and position information to the vehicles; and
   b2) each of the vehicles registering the registration message broadcast from the RSE to a second node management table of each vehicle.

9. The method as set forth in claim 6, further comprising the steps of:
   d) receiving warning messages broadcast from the vehicles over the ad-hoc network;
   e) transferring the received warning message to the traffic information service center.

10. A method for providing a user with traffic information, comprising the steps of:
    a) each of a plurality of vehicles broadcasting a registration message requesting its registration to form an ad-hoc network;
    b) a Road Side Equipment (RSE) receiving broadcast registration messages and registering the vehicles which broadcast the registration messages to a first node management table of the RSE to form the ad-hoc network associated with the vehicles; and
    c) the RSE receiving traffic information from a traffic information service center and transferring the traffic information to the registered vehicles through the ad-hoc network.

11. The method as set forth in claim 10, wherein each of the registration messages includes vehicle motion information.

12. The method as set forth in claim 10, wherein the step (b) includes the steps of:
- b1) the RSE broadcasting a registration message requesting its registration to the vehicles; and
- b2) each of the vehicles receiving the registration message broadcast from the RSE and registering the RSE to a second node management table of each vehicle.

13. An apparatus for providing a user with traffic information, comprising:
- each of a plurality of vehicles broadcasting a registration message requesting its registration and receiving registration messages broadcast by other vehicles to create an ad-hoc network;
- at least one Road Side Equipment (RSE) for receiving the registration message broadcast from each of the vehicles, registering the vehicles which broadcast registration messages to a node management table of the RSE, and collecting traffic information from the received registration messages; and
- a traffic information service center for receiving the traffic information from the RSEs.

14. The apparatus as set forth in claim 13, wherein the RSE broadcasts a registration message having position information of the RSE to the vehicles and participates in the ad-hoc network.

15. A Road Side Equipment (RSE) apparatus for collecting traffic information from a plurality of vehicles, and transferring the collected traffic information to a traffic information service center said RSE apparatus comprising:
- a Radio Frequency (RF) unit for receiving registration messages broadcast from the vehicles and broadcasting a registration message from the RSE to the plurality of the vehicles;
- a controller for registering the plurality of the vehicles to a node management table of the RSE by using the received registration messages to create an ad-hoc network associated with the vehicles and generating traffic information by using the registration messages; and
- a communication interface for transferring the generated traffic information to the traffic information service center.

16. The apparatus as set forth in claim 15, wherein the RF unit receives warning messages broadcast from the vehicles over the ad-hoc network, and the controller creates the traffic information by using the received warning messages.

17. The apparatus as set forth in claim 16, wherein the communication interface receives traffic information from the traffic information service center, and the controller transfers the received traffic information to the vehicles through in the ad-hoc network.

18. The apparatus as set forth in claim 15, further comprising:
- a position information receiver for detecting position and time information of the RSE apparatus.

\* \* \* \* \*